United States Patent [19]
Deregibus

[11] 4,393,099
[45] Jul. 12, 1983

[54] METHOD FOR WINDING VULCANIZABLE TAPE

[75] Inventor: Alfio Deregibus, Padua, Italy

[73] Assignee: The Goodyear Tire & Rubber Company, Akron, Ohio

[21] Appl. No.: 194,177

[22] Filed: Oct. 6, 1980

Related U.S. Application Data

[60] Continuation of Ser. No. 32,629, Apr. 23, 1979, abandoned, which is a division of Ser. No. 841,786, Oct. 13, 1977, Pat. No. 4,177,755.

[30] Foreign Application Priority Data

Apr. 5, 1977 [IT] Italy ................................ 23159 A/77

[51] Int. Cl.³ .......................... B05D 1/36; B05D 3/12
[52] U.S. Cl. ..................................... 427/177; 57/259; 242/118; 427/205; 427/368

[58] Field of Search .......................... 57/259; 242/118; 427/205, 177, 368

[56] References Cited

U.S. PATENT DOCUMENTS 2,915,110 12/1959 Ferguson et al. ............... 427/205 X
3,690,912 9/1972 Nuzum ............................ 427/368 X
3,782,996 1/1974 Belue et al. ......................... 427/177

Primary Examiner—Michael R. Lusignan
Attorney, Agent, or Firm—William A. Drucker; R. P. Yaist

[57] ABSTRACT

A method for producing fabric reinforced tapes of vulcanizable rubbery material, to be wound and stocked in bobbins, comprising progressing the formed tape under means adapted for applying a thin layer of anti-adhesive zinc stearate on one face of the tape, preparatory to winding the tape into bobbins the turns of which are to be prevented from sticking to each other.

3 Claims, 2 Drawing Figures

METHOD FOR WINDING VULCANIZABLE TAPE

This is a continuation of Ser. No. 032,629, filed Apr. 23, 1979, now abandoned, which is a division of Ser. No. 841,786, filed Oct. 13, 1977, now U.S. Pat. No. 4,177,755; patented Dec. 11, 1979.

BACKGROUND OF THE INVENTION

1. Field of the Invention

This invention relates to a method for producing continuous tapes of natural or synthetic rubber which can be vulcanized, and their arrangement into bobbins for the manufacture of articles and in particular hose. More specifically, this invention relates to the production of rubberized fabric tapes, ro rubber tapes reinforced with a textile structure, e.g. the coating with rubber or the coupling with a layer of nautral or synthetic vulcanizable rubber, of a fabric tape, and the winding of such tapes into bobbins for their subsequent use, in particular for the production of hose.

2. Description of the Prior Art

A characteristic condition of the preparation of these continuous tapes is that they must be provided with a superficial coating of zinc stearate or other anti-adhesive covering material, for raw rubber, in such a way as to prevent, during winding of these tapes into bobbins, the adjacent turns adhering to one another, which would prevent or present difficulties in the course of their subsequent unwinding. The presence of the stearate or equivalent material does not cause drawbacks in the course of the vulcanizing process, provided that it is used in very limited quantities and, above all, that it does not penetrate to the bottom of the textile layer so as to block up its porosity.

SUMMARY OF THE INVENTION

It has been established by the Applicant that these conditions can be fully observed, with advantages both in the handling of the tapes and, above all, for the qualitative characteristics of the semi-finished products and of the hose when carrying out the "talcing" (this expression, although inexact, is traditionally used in the art, in that it recalls the traditional application or dusting with talc of the components of vulcanized rubber) of the tapes on condition that:

the quantity of stearate is limited and measured precisely and that this quantity is applied exclusively to the surface of the tape which is composed of the layer of raw rubber coated on the fabric.

It has also been established that the presence of the measured dose of zinc stearate on the surface presented by the rubber is sufficient for the formation of an interfacial layer between the adjacent turns of the bobbins, in order to assure that it can be unwound easily, without the transference of the stearate to the surface of the next turn of the bobbin, composed of fabric.

These and other features of the invention will appear in the course of the following detailed description of a preferred but not exclusive embodiment with reference to the accompanying drawings;

DESCRIPTION OF THE PREFERRED EMBODIMENT

Figure 1:
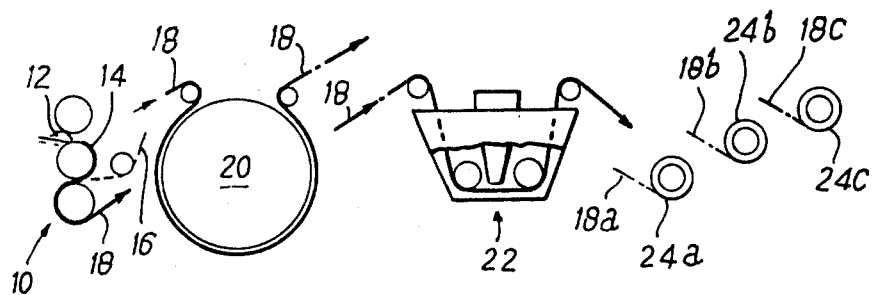
FIG. 1 shows schematically a portion of a complete production line.

With particular reference to the figures in the drawing:

As schematically illustrated in FIG. 1, the typical procedure for the formation of these tapes and the assembly of them into bobbins comprises a sequence carried out by means of a first device 10—for laminating and calandering in which a mixture of vulcanizable rubber 12 (natural or synthetic) is laminated around a pair of calandering cylinders, so as to form a rubber tape 14, which is then coupled to a fabric tape 16, so as to form the desired rubberized fabric 18, or reinforced rubber tape. This rubberized fabric 18, having been previously cooled by means of coming into contact over a large part of the surface of at least one refrigerated drum 20, is then made to pass through a device 22 for the application, under the characteristic conditions described below, of a thin layer or film of zinc stearate, on only one surface of the tape. As it particularly concerns a linenized tape, or rubberized fabric 18, this application is carried out on the surface made up of rubber. The tape-like material thus treated is then sent to be wound into bobbins. Given that the tape-like material is generally produced as a primary tape of considerable width, this tape is cut longitudinally, by cutting or tearing, and subdivided into a number of adjacent narrower tapes 18a, 18b, 18c and 18d (FIG. 2) individually wound into bobbins 24a, 24b . . . , preferably but not necessarily by means of procedures and devices which are subject of other contemporaneous patent applications, by the same Applicant.

Figure 2:
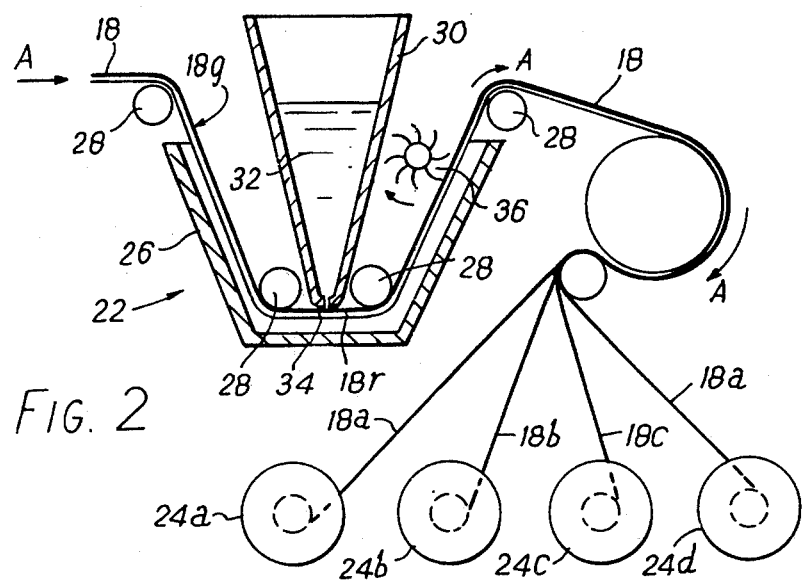
FIG. 2 shows an apparatus forming part of the production line.

Features of the device 22, forming the main part of the equipment, are shown in greater detail in FIG. 2. This device comprises a receiver or container open along the top 26, into which the tape 18, with its rubberized surface 18g facing upwards, is made to advance along a predetermined path, by means of a number of guiding and returning rollers 28, this path following a horizontal or approximately horizontal line 18r, near the bottom of the container 26, and along which the rubberized surface 18g still faces upwards.

The zinc stearate is regularly measured and applied to the rubberized surface, by descending through a feedbox 30 in which a quantity 32 of zinc stearate descends by gravity to emerge in measured quantities through a lower opening 34, preferably through slits, or a number of closely aligned orifices, to be placed on to the said rubberized surface 18g of the material advancing in direction A.

The control of the uniform distribution of the zinc stearate and the removal of any possible excess of the zinc applied, are assured by the presence and the activity of at least one rotating brush 36, counter-rotating in relation to the direction A of the advancing tape-like material, and operating on an ascending stretch of its path, after the application point of the stearate, at 34. Suitable means of aspiration can be arranged in order to carry away the particles of stearate left in the atmosphere.

The apparatus may be integrated with auxiliary means and devices in particular adapted to assure regular descent of the zinc stearate in the feedbox 30. For example, the feedbox could be integrated with a suitable vibrator and/or agitating system, such as paddles, scrolls or the like, which can be arranged and operated on the inside of the feedbox, so as to make the mass of stearate 32 agitate and to prevent localized blockage. The exit orifice 34 could also be integrated with means adapted to vary its cross section, so as to predetermine its output.

I claim:

1. A method, for the formation of a tape having raw vulcanizable rubber exposed at one major face of the tape and fabric exposed at the other major face of the tape, which comprises the steps of:
   (i) entraining the tape about successive spaced guide rollers such that the portion of tape lying between the rollers is substantially horizontal and has said one major face of raw vulcanisable rubber exposed upwardly;
   (ii) depositing downwardly onto said upwardly exposed substantially horizontal major face of said tape portion a layer of zinc stearate powder to provide a powder-bearing face on which some of said powder is secured by tackiness of the rubber to serve as an anti-adherent, whereas other of said powder remains loose on said upwardly exposed face;
   (iii) causing said tape as it leaves the downstream one of said guide rollers to have a portion of its length passing upwardly at an inclination, and
   (iv) acting with a rotary brush, disposed at an intermediate position along the upwardly inclined portion of tape, on said powder-bearing face for removing from said face that powder which remains loose on said face.

2. The method claimed in claim 1, including the further step of thereafter dividing said powdered brushed tape longitudinally into plural tape portions.

3. The method claimed in claim 2, including the further step of winding each of said plural tape portions individually into a respective bobbin of tape.

* * * * *